(12) United States Patent
Tuck et al.

(10) Patent No.: US 8,442,763 B2
(45) Date of Patent: May 14, 2013

(54) METHOD AND APPARATUS FOR GEOGRAPHICALLY AIDING NAVIGATION SATELLITE SYSTEM SOLUTION

(75) Inventors: David Allan Tuck, Costa Mesa, CA (US); Mangesh Chansarkar, Irvine, CA (US); Ardalan Heshmati, Saratoga, CA (US)

(73) Assignee: CSR Technology Holdings Inc., Sunnyvale, CA (US)

( * ) Notice: Subject to any disclaimer, the term of this patent is extended or adjusted under 35 U.S.C. 154(b) by 0 days.

(21) Appl. No.: 12/762,060

(22) Filed: Apr. 16, 2010

(65) Prior Publication Data

US 2011/0257885 A1    Oct. 20, 2011

(51) Int. Cl.
*G01C 21/30* (2006.01)
(52) U.S. Cl.
USPC ............ 701/446; 701/445; 701/468; 701/469
(58) Field of Classification Search ........... 701/400, 701/408, 409, 445, 446, 447, 468, 469, 470, 701/472, 479, 480, 534, 535, 536
See application file for complete search history.

(56) References Cited

U.S. PATENT DOCUMENTS

| | | | | |
|---|---|---|---|---|
| 4,700,307 A * | 10/1987 | Mons et al. | ................ | 701/446 |
| 5,272,483 A | 12/1993 | Kato | | |
| 5,394,333 A | 2/1995 | Kao | | |
| 5,513,110 A * | 4/1996 | Fujita et al. | ................ | 701/410 |
| 5,717,389 A * | 2/1998 | Mertens et al. | ................ | 340/928 |
| 5,731,978 A | 3/1998 | Tamai et al. | | |
| 5,902,351 A * | 5/1999 | Streit et al. | ................ | 701/446 |
| 6,240,368 B1 * | 5/2001 | Kreft | ................ | 701/411 |
| 6,392,589 B1 | 5/2002 | Rogers et al. | | |
| 6,496,778 B1 | 12/2002 | Lin | | |
| 6,639,550 B2 * | 10/2003 | Knockeart et al. | ....... | 342/357.31 |
| 6,643,587 B2 | 11/2003 | Brodie et al. | | |
| 6,658,353 B2 * | 12/2003 | Shimizu et al. | ............... | 701/410 |
| 6,664,924 B2 * | 12/2003 | Knockeart et al. | ....... | 342/357.31 |
| 6,915,205 B2 | 7/2005 | Kim et al. | | |

(Continued)

FOREIGN PATENT DOCUMENTS

| | | |
|---|---|---|
| EP | 1162432 | 12/2001 |
| WO | 00/50917 | 8/2000 |
| WO | 2008/121122 | 10/2008 |
| WO | 2009/060775 | 5/2009 |

OTHER PUBLICATIONS

U.S. Appl. No. 12/409,315, filed Mar. 23, 2009, Miocinovic et al.

*Primary Examiner* — Joseph Rocca
*Assistant Examiner* — Barry Gooden, Jr.
(74) *Attorney, Agent, or Firm* — Pillsbury Winthrop Shaw Pittman LLP

(57) ABSTRACT

The present invention is related to position calculation and navigation systems, and more particularly, to a method and apparatus for making accuracy improvements to a GPS receiver's navigation solutions. According to a first aspect, selective cartography information from a map database accessed by a GPS receiver from a location-aiding device is integrated into the position calculations performed by the GPS receiver. According to another aspect, selective cartography information includes indices representing associated attributes of geographical objects, such as, a width-indicator index for a road segment.

23 Claims, 10 Drawing Sheets

U.S. PATENT DOCUMENTS

| | | | |
|---|---|---|---|
| 7,962,282 B2 * | 6/2011 | Fujita et al. | 701/446 |
| 2005/0085995 A1 | 4/2005 | Lee et al. | |
| 2006/0178824 A1 | 8/2006 | Ibrahim | |
| 2006/0212216 A1 * | 9/2006 | Kobayashi et al. | 701/207 |
| 2007/0239347 A1 * | 10/2007 | Watanabe et al. | 701/200 |
| 2008/0004804 A1 * | 1/2008 | Fujita et al. | 701/210 |

* cited by examiner

METHOD AND APPARATUS FOR GEOGRAPHICALLY AIDING NAVIGATION SATELLITE SYSTEM SOLUTION

FIELD OF THE INVENTION

The present invention is related to positioning systems, and more particularly, to a method and apparatus of integrating a map-matching algorithm with a navigational routine in a geographically-aided position determination algorithm in satellite positioning systems, such as GPS systems.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any future Western European SPS such as the proposed "Galileo" program. The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time. In this application, we use the term Navigation Satellite System (NSS) to encompass any type of satellite-based communication system used for navigation, specifically terrestrial navigation, by a GPS receiver. The GPS receiver is typically included in a navigation device.

Navigation devices, including personal navigation devices (PND), such as those available from Garmin and other manufacturers, typically include extensive map databases covering entire countries or regions to provide real-time position displays and turn-by-turn directions among other things. In conventional systems, typically NSS data is passed to an application that utilizes a map database, and a map-matching algorithm determines which road is most likely to be the one where the navigation device containing the GPS receiver is traveling on. This is done so that the initial location calculated from the NSS data snaps to a physical geographical object, such as, a road, for a final output displayed by the navigation device. However, the navigation device seldom takes advantage of selective cartography information obtained by using the map-matching algorithm to further improve the positional accuracy of the navigation device by incorporating appropriate positional correction to the originally determined location derived from the NSS data.

Improving the positional accuracy becomes more of a necessity in environments where satellite signals are degraded, and, as a result, the GPS receiver frequently encounters problems in locking onto the signals that are needed for the calculation of position, velocity, altitude, and time. In a degraded signal environment (e.g., a signal environment where signal strength is below 28 dBHz), satellite signals can be weak or otherwise difficult for GPS receivers to lock on to. Degraded signal environments are often encountered in urban areas, such as cities with many tall buildings. A city with many tall buildings contain "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas.

One way to improve the accuracy of a calculated GPS position is to make accuracy improvements with the aid of a map database. Some attempts have been made to provide cartography information from this map database back to the GPS receiver in real-time to aid in the receiver's navigation solution. For example, co-pending U.S. patent application Ser. No. 12/409,315, filed Mar. 23, 2009, titled, "Method and Apparatus for Improving GPS Positioning Using an Embedded Map Database," describes cartography information embedded within a GPS receiver. However, embedding a map database in the GPS receiver itself may lead to bulkier navigation device size. In order to optimize the size of the navigation device, size of the map database itself and/or complexity of the map-matching or navigational algorithms may have to be compromised.

Accordingly, a method and apparatus for making better accuracy improvements to a GPS receiver's position calculations in degraded signal environments remain desirable, where selective cartography information can be extracted from a map database that is optimized for providing positional correction in tandem with a navigational routine executed by the GPS receiver. In other words, it is desirable to provide geographic aiding from a map database to improve a solution obtained by the GPS receiver from NSS data.

SUMMARY OF THE INVENTION

The present invention is related to positioning systems, and more particularly, to a method and apparatus for making accuracy improvements to a GPS receiver's navigation calculations with geographical aiding using selective cartography information.

According to a first aspect, a method for improving positional accuracy of a GPS receiver is disclosed. The method comprises: deriving an initial location from a navigation satellite system (NSS) data received at a GPS receiver, wherein the initial location is determined to be within an area of interest; receiving navigation state information of the GPS receiver; receiving selective cartography information from a location-aiding device coupled to the GPS receiver, wherein the selective cartography information includes attributes of one or more geographic objects within the area of interest; overlaying the initial location onto the selective cartography information; deriving positional correction from the NSS data, the navigation state information, the selective cartography information; applying the derived positional correction to the initial location to determine a corrected location of the GPS receiver; and outputting the corrected location of the GPS receiver.

In additional furtherance of the above aspect, the method further comprises: using a navigational routine to correlate selective cartography information with the initial location derived from the NSS data while deriving positional correction.

In yet additional furtherance of the above aspect, the method further comprises using indices associated with attributes of geographical objects to be stored as cartography information. Example of one such index is an width-indicator index. The indices may be used to calculate an associated variance.

In furtherance of these and other aspects, a system is disclosed, wherein the system performs the above method for improving positional accuracy of a GPS receiver, wherein the system comprises a navigation device containing the GPS receiver; and a location-aiding device. The location-aiding device is one or more of a remote server, and, an on-board computer external to the navigation device but located within a moving object that includes the navigation device.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

General Environment in a Satellite-Based Navigation System for Implementing Example Embodiments of the Present Invention Prior to discussing the present invention, a brief discussion regarding the overall system for satellite-based navigation system is provided.

Figure 1:
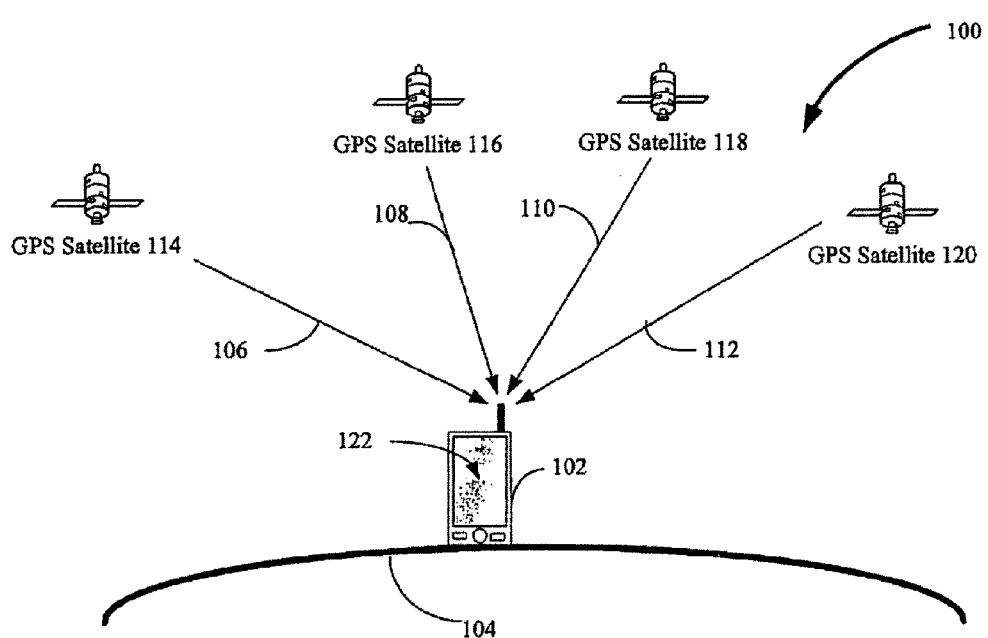
FIG. 1 is a block diagram of an example implementation of principles of the invention.

FIG. 1 illustrates an example implementation of embodiments of the invention. As shown in FIG. 1, a satellite system 100 comprises GPS satellites (i.e. SVs) 114, 116, 118 and 120 broadcasting signals 106, 108, 110 and 112, respectively, that are received by receiver 122 in handset 102, which is located at a user position somewhere relatively near the surface 104 of earth. The received data from the satellites is referred to as NSS data in the present application.

Handset 102 can be a personal navigation device (PND, e.g. from Garmin, TomTom, etc.) or it can be a cell or other type of telephone with built-in GPS functionality, or any GPS device embedded in tracking applications (e.g. automotive tracking from Trimble, package or fleet management tracking from FedEx, child locator tracking applications etc).

Receiver 122 can be implemented using any combination of hardware and/or firmware/software, including GPS chipsets such as SiRFstarIII GSD3tw or SiRFstar GSC3e from SiRF Technology and BCM4750 from Broadcom Corp. and associated firmware/software, as adapted and/or supplemented with functionality in accordance with the present invention, and described in more detail herein. More particularly, those skilled in the art will be able to understand how to implement the present invention by adapting and/or supplementing such chipsets and/or software with the navigation solution improvement techniques of the present invention after being taught by the present specification.

As discussed in the background section, in conventional systems, a map database may be used to snap an initial location calculated from the NSS data to a physical geographical object, such as, a road, for a final output displayed by the navigation device. In the present invention, selective cartography information obtained by using a map-matching algorithm is used to further improve the positional accuracy of the navigation device by incorporating appropriate positional correction to the originally determined location derived from the NSS data. The positional accuracy improvement is done using both a map-matching algorithm and the GPS receiver's navigational routine.

When a GPS receiver enters a geographical region for which the map database is available, map-matching logic may be initiated. In one embodiment, selective cartography information from the map database is integrated with a navigational filter in a navigational routine. A parameter or several parameters of the navigational filter may be adjusted based on the cartography information from the map database. The GPS receiver's position is then calculated using the navigational filter with the adjusted parameters. The accuracy of the GPS receiver's position calculation is improved through adjustments made to the navigational filter because the adjustments made are based on selective cartography information that is additional to the information the GPS receiver extracted from received satellite signals. In this manner, the position of a GPS receiver may be more accurately determined even in degraded signal environments where satellite signals are weak or are otherwise difficult to extract information from, such as in an urban canyon created within a heart of a city where tall obstructing structures are likely to b present in high density. The map database needs to be accessed quickly and efficiently by the GPS receiver so that cartography information can be used in the real-time position calculations performed by the GPS receiver.

Further details regarding integrating cartography information from a map database in a navigational algorithm used in a GPS receiver are described in more detail below.

Example Methods of the Present Invention

Figure 2:
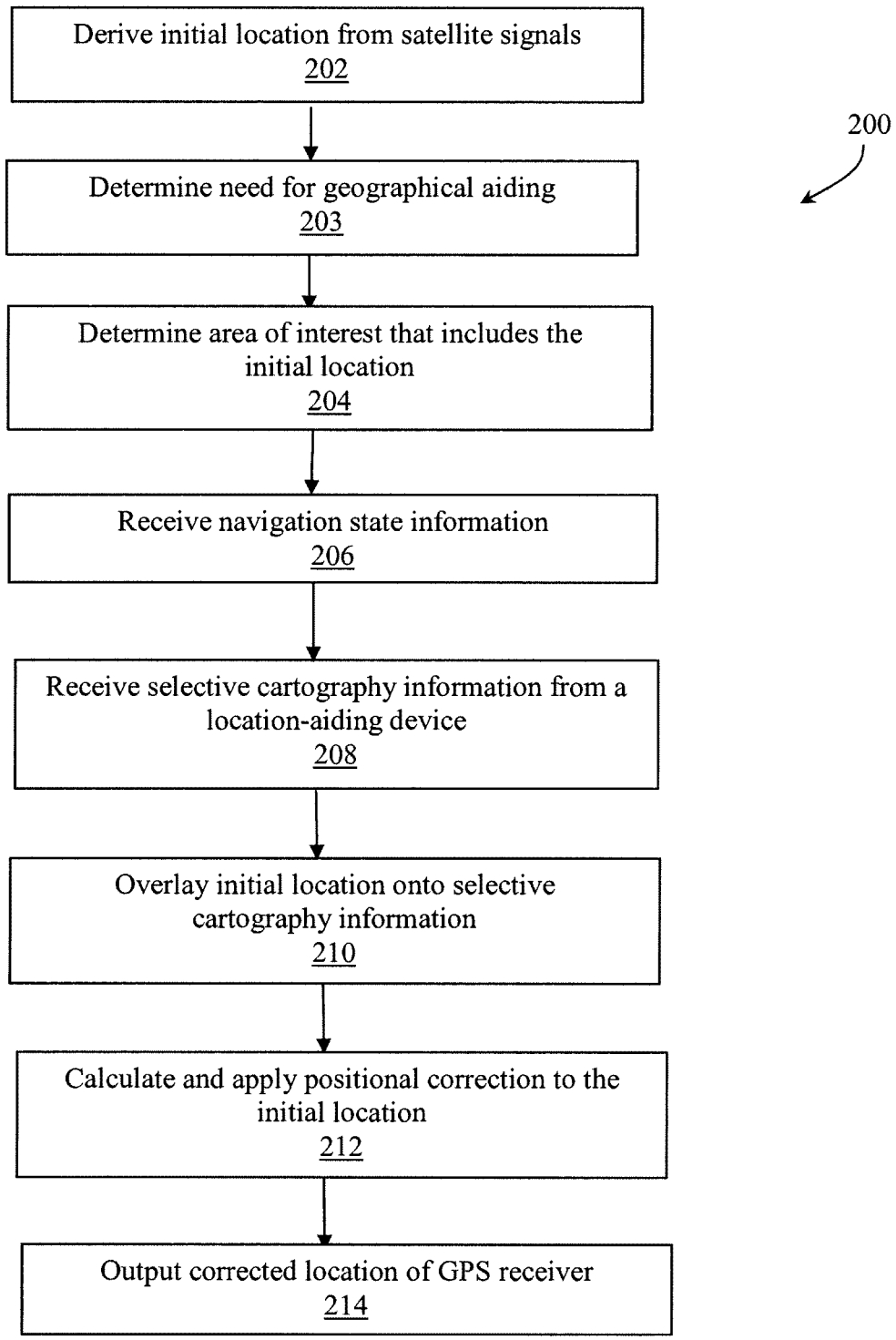
FIG. 2 is a flowchart illustrating an example methodology for outputting a corrected location that can be performed in accordance with aspects of the invention.

FIG. 2 is an exemplary flowchart illustrating the method of improving positional accuracy in accordance with an embodiment of the present invention. Flowchart 200 in FIG. 2 shows some key steps of an example method on a high level.

Flowchart 200 starts at step 202, where an initial location is derived from satellite signals. In the next step 203, it is determined that a geographical aiding or location-aiding routine may be beneficial. This determination may be based on many parameters, such as, monitoring geographic region, i.e. urban centers, monitoring the signal-to-noise ratio, calculating the time required to obtain an acceptable signal etc. Alternatively, as shown in step 204, if it is determined that the GPS receiver's initial location is in a known difficult or weak signal environment, such as, in an urban canyon, then the location-aiding routine is automatically initiated. It is to be needed that steps 203 and 204 may occur simultaneously or in a reverse order, i.e., step 204 followed by step 203. Weak or difficult signal environments are pre-stored as geographic areas of interests in a map database, as will be discussed later.

In step 206, navigation state information of the GPS receiver is obtained. Example navigation state information includes, but are not limited to, position, heading direction, velocity, and altitude. Accelerometers, gyros, magnetic compasses, barometers etc. may be used as different kinds of sensors that collect navigation state information, and pass along to the position determination routine.

In step 208, selective cartography information is retrieved from a location aiding device. This step will be elaborated with examples in the subsequent sections, for example with reference to FIGS. 3A, 3B, and 4. Selective cartography information may contain the nearest road segments or line segments along a road, and/or the nearest intersection/connection/end points relative to the initial location derived from the NSS data.

In step 210, the initial location is overlaid onto the selective cartography information received in step 208.

In step 212, a positional correction value is calculated based on the initial location, the navigational state information, and the selective cartography information. This positional correction is then applied to the initial location to determine a corrected location. The corrected location has improved positional accuracy compared to the initial location, especially in a difficult signal environment. This is treated as a measurement so there is an associated positional correction variance provided based on confidence of the map matching and weighting scheme.

In step 214, the corrected location is communicated to the user as an output displayed on their navigation device. The corrected location is placed on or near a real geographical object. For example, a car icon is displayed on or near a road segment at the corrected location on the GPS screen.

The map database used for the present invention is optimized for easy and fast access and faster computation. The map database contains cartography information that includes information that defines networks of roads and associated attributes. In conventional systems, map databases generally contain detailed cartography information for regions spanning a country or a continent and are consequently very large in size (at least several gigabytes). It may be impractical and inefficient to use such large map databases wholesale into a GPS receiver for the purpose of improving the accuracy of the GPS receiver's position calculations. Therefore, according to one embodiment, the map database to be accessed by the GPS receiver is reduced to a size smaller than that of a typical map database in a manner optimized for the purpose of improving the accuracy of the GPS receiver's position calculations.

In embodiments, a map database to be accessed by the GPS receiver contains cartography information for geographic regions that are likely to contain degraded signal environments. In a degraded signal environment, satellite signals are weak or otherwise difficult for use by GPS receivers to extract information from. Which geographic regions are likely to contain degraded signal environments may be determined beforehand. In some embodiments, the map database may contain little or no cartography information on geographic regions other than the geographic regions that have been identified as likely to contain degraded signal environments, thereby reducing the size of the map database. Since urban areas are likely to contain degraded signal environment due to the densely located and often tall buildings in urban areas, the map database may contain cartography information only for urban areas. In one embodiment, the map database contains cartography information only for a certain number of urban areas. For example, the map database may only contain cartography information for the top fifty metropolitan areas in the United States. Additionally, only cities with dense urban areas may be chosen as they provide the most challenging signal environments where the map aiding has the greatest supplementary value.

Figure 3A:
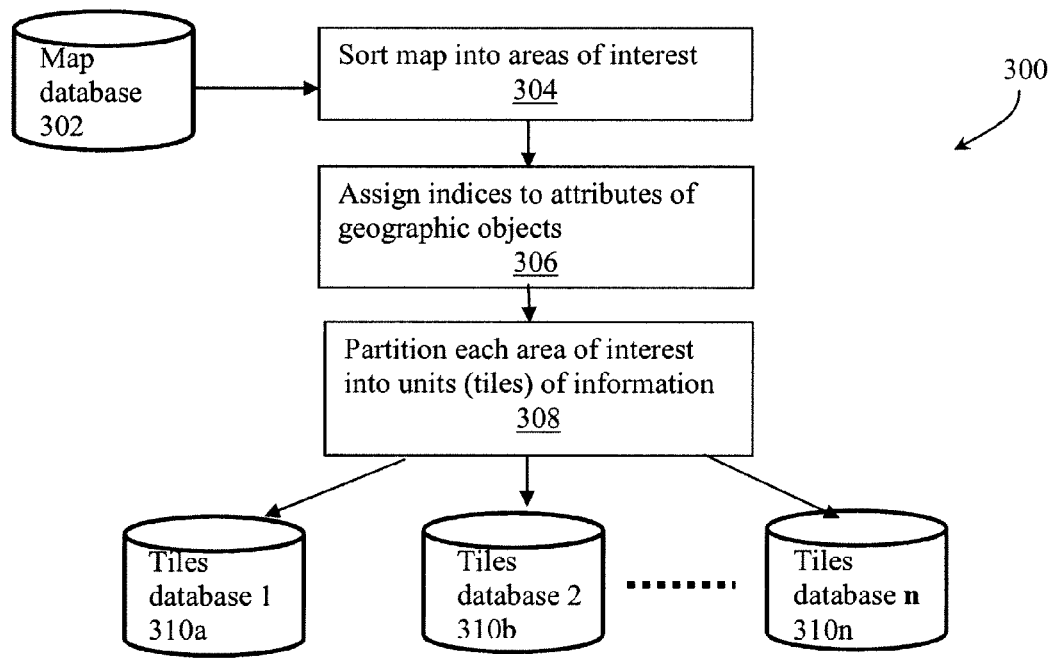
FIG. 3A depicts how a map database is optimized for providing selective cartography information, in accordance with embodiments of the present invention.

As shown in FIG. 3A, a map database 302 is pre-sorted into a number of geographic areas of interests (step 304 of flowchart 300). Each area of interest (such as, downtown of city 1, downtown of city 2 etc.) contain a collection of geographic objects. Examples of geographic objects include, but are not limited to, road, lanes, intersection points where two roads cross each other, connection points, where one or more roads/lanes meet, end points, where a road/lane terminates, traffic circles, polygonal traffic plazas etc. Other natural or man-made three-dimensional objects, such as, a stream, a bridge, a statue etc.) may be also included in the geographic object set. Note that the terms 'connection point' and 'end point' are used interchangeably in certain instances in this application.

Each geographic object has a set of attributes associated with it. For example, a road segment may have a set of attributes containing a line segment along the road between two nodes, the nodes being two intersection points (or connection/end points) that the road passes through. Other attributes may be no. of lanes in the road, total width of the road, width of each lane, whether some of the lanes are for one-way traffic, whether some of the lanes are designated as parking lane or turning lane etc. Similarly, for a traffic circle, the radial dimension of the circle, the connecting points where various roads are meeting with the traffic circle, the flow of traffic direction etc. are pre-stored as attributes. For a polygonal traffic plaza, a diametric distances, such as corner-to-corner or center-to-corner distances and connection/end points (i.e., the corner points) may be relevant attributes to be stored.

In one embodiment, all or some of the attributes of each geographic object is assigned an index (step 306 in flowchart 300 in FIG. 3A). For example, a width-indicator index may be assigned to roads or lanes of the roads. A width-indicator index may be assigned to intersection/connection/end point too. A predetermined variance associated with attributes of the geographic objects may take into account the width-indicator or other indices while computing the positional correction. For example, the wider the road, the higher the variance associated with it. This allows for tighter positional correction on a narrower road, and a more relaxed positional correction on a wider road. Wider roads have relaxed thresholds to determine status as aligned with the road than narrow roads as more variability can occur on a wider road. Even non-physical attributes, such as drivability, city name, speed limit etc. may be assigned corresponding indices, and are stored in the modified map database.

Persons skilled in the art will appreciate that the variance can be calculated based on a variety of parameters in addition to or alternative to the width. For example, a variance can be calculated based on an ability to detect if a vehicle is on the road, i.e. if the velocity is higher than the reference velocity of a pedestrian. The variance may also be decided based on whether the heading direction matches a designated direction of traffic flow in a road segment or a road azimuth. The corresponding confidences for which position, speed, and heading direction may be ascertained feed into the position correction variance.

As further shown in flowchart 300 in FIG. 3A, each area of interest is partitioned into units of cartography information, referred to as tiles. For example, tile 1 may contain cartography information of a few city blocks in a first city, and tile 2 may contain cartography information of the next few city blocks adjacent to those in tile 1. Thus, several tiles databases 310 are created to store the cartography information of the each area of interest in an optimized form for quick access and use by the GPS receiver. For example, downtown San Francisco may have a corresponding tile database 310*a*, downtown Los angeles may have a corresponding tiles database 310*b* etc. It is possible to have multiple tiles databases for just one city, for example, each of north-east, south-east, north-west, and south-west sections of Washington D.C. may have their own tiles databases.

Figure 3B:
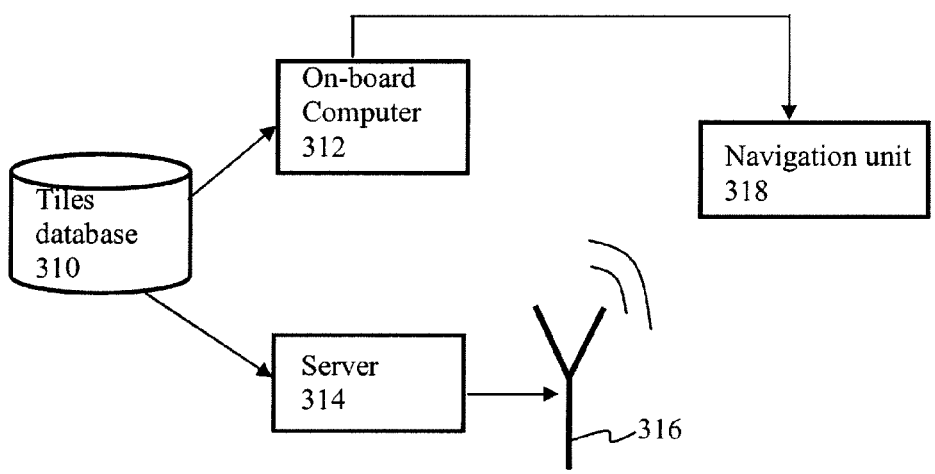
FIG. 3B shows example systems where the optimized map database is stored at an external location-aiding device, according to embodiments of the present invention.

The greater the number of elements contained in the map/tiles database, the bigger the size of the map/tiles database. Similarly, the greater the number of attributes associated with elements contained in the tiles database, the bigger the size of the tiles database. Therefore, when the map/tiles database is embedded in the GPS receiver itself, the optimized tiles database may contain few or no elements other than elements that can be used to facilitate the determination of the GPS receiver's position, thereby reducing the size of the embedded map/tiles database. This may compromise the accuracy achievable by the position determination routine. To allow maximum flexibility of storing useful attributes for geographical location-aiding, embodiments of the present invention store tiles databases in a location-aiding device external to the GPS receiver, or even external to the navigation device that contains the GPS receiver. As shown in FIG. 3B, tiles database 310 may be stored in a remote server 314, and when requested, the specific tile(s) are supplied to the navigation unit 318 through wireless antenna 316, or through other communication channels (not shown). Alternatively, the tiles database may be stored on another computer 312 on-board the vehicle that has the navigation device installed, but the computer 312 is external to the navigation device 318 in order to reduce the size of the navigation device 318. For example, the tiles database 310 may be stored in an entertainment system (e.g., a DVD player) on-board a car, or in any other control system used in the car for desired functioning of the car.

In one embodiment, the map/tiles database is stored in non-volatile (e.g. flash) memory in the location-aiding device that is readily accessible by the GPS receiver. In another embodiment, a mechanism is set up on a processor included in the GPS receiver to receive selective cartography information from the tiles database, as needed. The one or more tiles, i.e., the portions of the map database sent to the GPS receiver, contain relevant cartography information for road segments in the vicinity of the current position of the receiver, as calculated from the NSS data.

As discussed before, the GPS receiver first obtains the initial location data derived from received satellite signals, then matches the initial location data to a "matched" road segment by using the cartography information obtained from the tiles database. This process of mapping location data to a road segment is also known as "map matching", and some example steps of a map matching process according to an embodiment of the invention are illustrated in flowchart 400 in FIG. 4. Persons skilled in the art will appreciate that The map-matching algorithm may be a part of an overall geographically-aided position determination algorithm used by the GPS receiver, or the map-matching and the navigational routine may the two distinct but inter-related components of the overall algorithm of geographically-aided position determination by the GPS receiver. In an embodiment, the map-matching algorithm is executed in an external location-aiding device that stores the map database. The resulting selective cartography information is then relayed to the navigational routine executed at the GPS receiver. In another embodiment, at least a portion of the map-matching algorithm is executed at the GPS receiver itself. In either case, the map/tile database needs to be accessed quickly and efficiently by the GPS receiver so that cartography information can be used in the real-time position calculations performed by the GPS receiver. The navigational state information, i.e., one or more of velocity, heading direction, altitude etc. may be used during the map-matching stage of the overall geographically-aided position determination algorithm or subsequent to the map-matching algorithm. If required, navigational state information may be used both in the map-matching algorithm and in the subsequent navigational routine executed at the GPS receiver.

Figure 4:
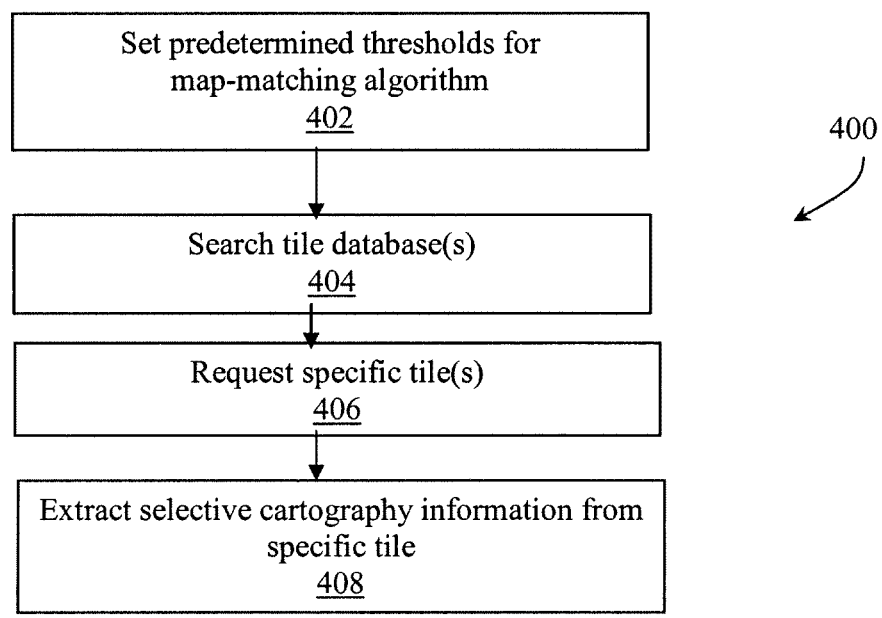
FIGS. 4 and 5 are flowcharts illustrating example steps of positional correction methods used by embodiments of the present invention.

In the example map-matching algorithm methodology shown in FIG. 4, one or more predetermined distance thresholds are selected. For example, the predetermined thresholds can be perpendicular distances for selecting a set of closest line/road segments relative to the initial location. The predetermined thresholds can also be radial distances for selecting a set of closest intersection/connection/end points relative to the initial location. Another type of threshold value is a road segment azimuth. Multiple threshold values and multiple types of thresholds may be used. This step is shown as step 402.

In step 404, all the tiles associated with a known area of interest within which the initial location is included, are searched using the predetermined thresholds.

In step 406, the specific tile is requested. In certain cases, the selective cartography information may be distributed among more than one pre-stored tiles. In certain embodiments, it is possible to dynamically rearrange the cartography information from multiple pre-stored tiles into one user-redefined tile for ease of use.

In step 408, selective cartography information, i.e. the nearest line/road segment and/or the nearest intersection/connection/end points, is extracted. Step 408 is similar to step 208 of flowchart 200 in FIG. 2.

It should be noted that other approaches for performing a map-matching function, aside from the approach depicted in flowchart 400, will become apparent to those skilled in the art after being taught by the present disclosure. These may also be employed and the invention is not limited to any specific map-matching process.

Once map-matching has been performed and a matched road segment or matched intersection/connection/end point has been identified, the matched road segment or intersection/connection/end point may be used in the GPS receiver's navigational routine. Specifically, information about the matched road segment may be used to adjust a parameter or parameters of a navigational filter used in the navigational routine. The details regarding how the matched road segment may be used to adjust the parameters of a navigational routine are described below.

Figure 5:
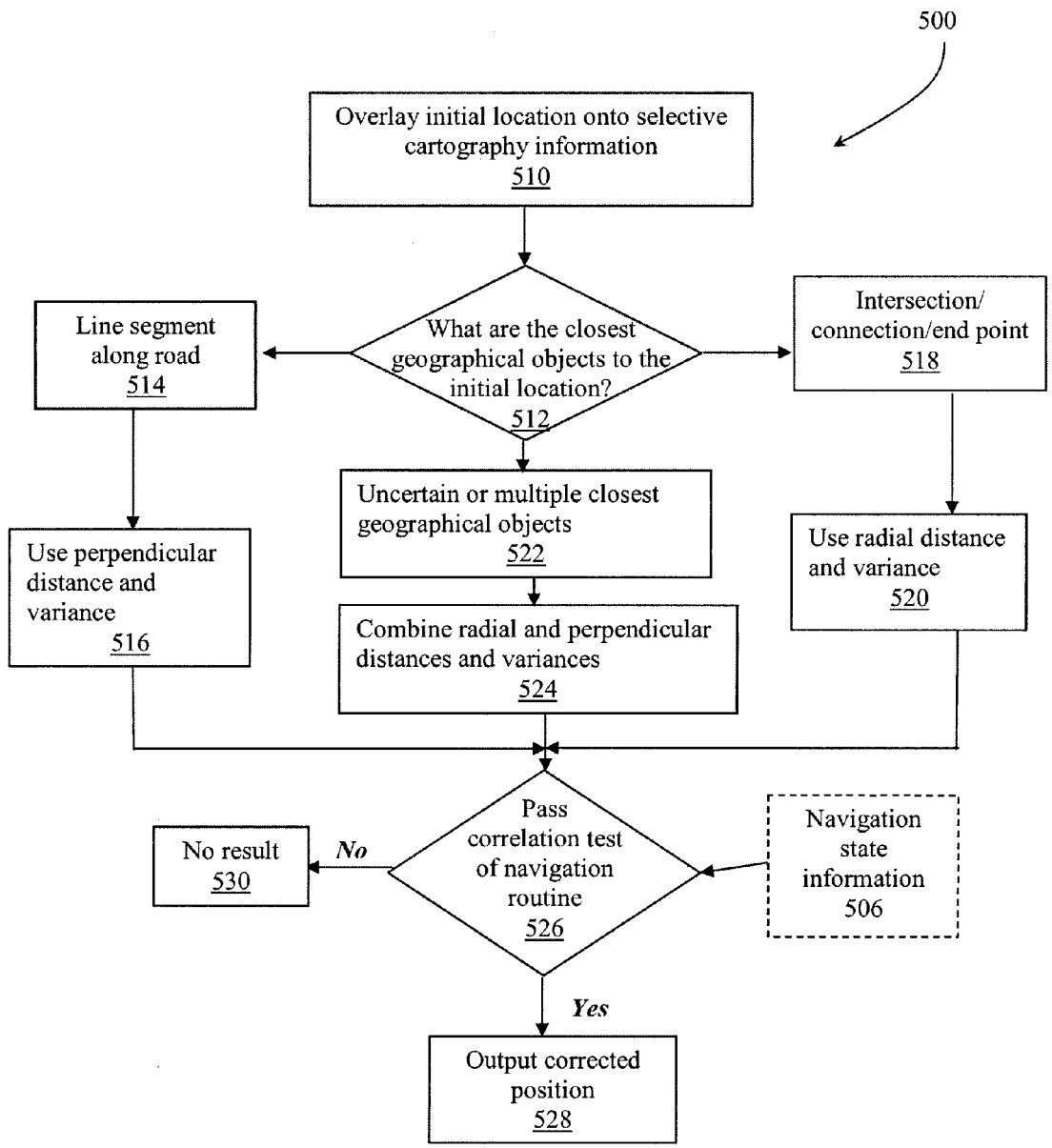

As shown in flowchart 500 in FIG. 5, in step 510, the GPS receiver overlays the initial location onto selective cartography information obtained from the map/tiles database. Step 510 is similar to step 210 of flowchart 200 in FIG. 2.

In step 512, it is determined whether the closest geographical object to the initial location is a line/road segment, an intersection/connection/end point, or if there is some uncertainty as multiple geographical objects might be candidate closest objects.

If it is determined that the closest object is a line/road segment, as shown in step 514, then a perpendicular distance between the initial location and the line/road segment is calculated, and a corresponding predetermined variance is associated with the calculation (step 516), and the result is passed onto the navigational routine of the GPS receiver. This type of perpendicular distance is often referred to as the "cross-track error."

If it is determined that the closest object is an intersection/connection/end point, as shown in step 518, then a radial distance between the initial location and the intersection/connection/end point is calculated, and a corresponding predetermined variance is associated with the calculation (step 520), and the result is passed onto the navigational routine of the GPS receiver.

In case of uncertain or multiple closest object scenario (step 522), a set of perpendicular and radial distances and corresponding variances are combined to iteratively or otherwise come up with a unique solution with or without a variance (step 524), and the result is passed onto the navigational routine.

In step 526, the result is subject to a correlation test that is part of the navigational routine. Navigation state information 506 is also used by the navigational routine. In one possible approach of the correlation test of the navigational routine, a navigation filter, such as, a Kalman filter is used. In one example, at least one measurement of the Kalman filter is updated based on a heading direction of the matched road segment. After the Kalman filter is updated, the GPS receiver uses the updated Kalman filter to determine a more accurate position of the GPS receiver. Furthermore, the heading measurement update from the matched road segment may be applied only when the GPS receiver's velocity is greater than a particular velocity threshold, such as 3 m/sec. Additionally or alternatively, the heading measurement update from the matched road segment may be applied only when the certainty associated with the matched road segment is above a particular certainty threshold, such as 90%. Both the velocity threshold and the certainty threshold may also be adjustable.

Other possible correlation techniques that may be employed by the navigational routine include, but are not limited to: the least-squares combiner technique, maximum likelihood estimator technique, particle filter technique, neural networks technique, and Bayesian estimator technique.

If the corrected position pass the correlation test of the navigational routine, the corrected result is output, as shown in step 528. Otherwise, a 'no result' output may be displayed, as shown in step 530, or the system may go back to step 510 or any of the even earlier steps as shown in flowchart 200.

Persons skilled in the art will appreciate that the methods shown in FIGS. 2, 3A, 4 and 5 only depict illustrative steps. Not all the steps need to be included in every embodiment, and additional intermediate/terminal steps may be included in the methods, as applicable. The sequence of the steps may be altered.

Position Correction from a Line Segment

Figure 6:
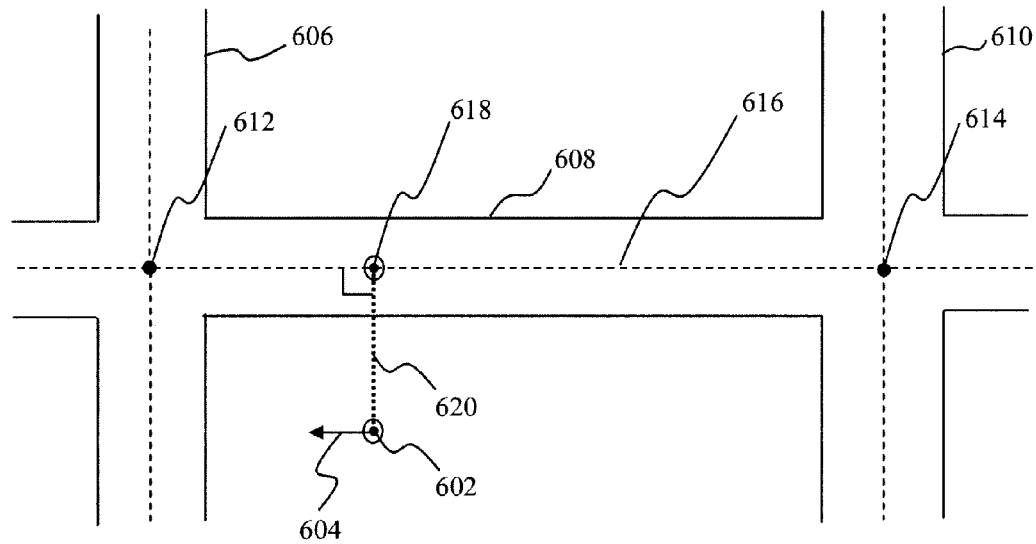
FIGS. 6 and 7 show example positional corrections from a line segment and an intersection point, respectively.

FIG. 6 shows how a perpendicular positional correction is applied to an initial location 602 derived from the NSS data prior to geographic aiding. The heading direction 604 is known as part of the navigational state information obtained by the GPS receiver. Using the map-matching algorithm, it is determined that the closest road segment is line 616 along a road 608. Intersection points 612 and 614 with cross streets 606 and 610 respectively define the azimuth of the line 616. Width of the road 608 may have been considered to associate a variance to the calculated cross track error 620. The corrected position is at point 618 on the road 608. Note that though in many real cases, roads cross each other at a 90° angle, as shown in FIG. 6, the algorithm is not dependent on the angle between the cross-roads.

Position Correction from an Intersection

Figure 7:
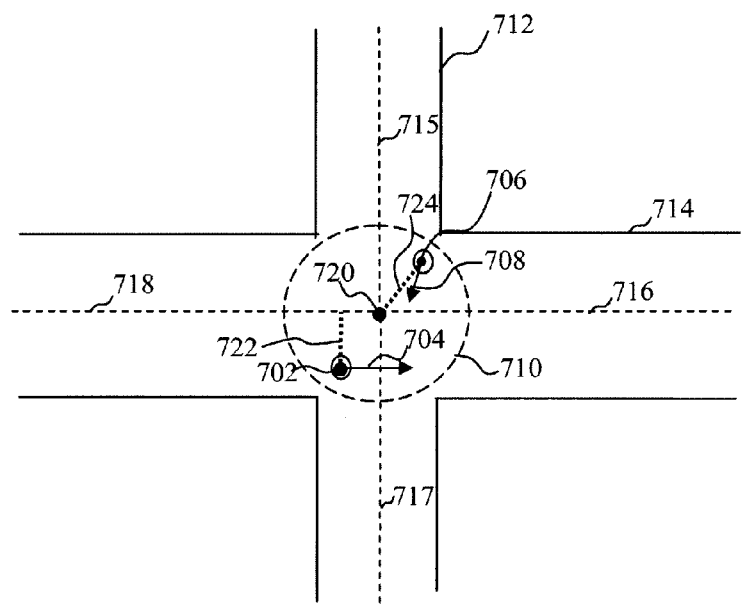

FIG. 7 shows how a radial (or perpendicular, if appropriate) position correction is applied to an initial location 702 or 706. The heading direction at initial location 702 is 704. The heading direction at initial location 706 is 708. Line segments 715 and 717 along road 712, and line segments 716 and 718 along road 714 all meet at intersection point 720. A road-width parameter is associated with each road, and an intersection radius is associated with the intersection point 720 (i.e., the radius of the dashed circle 710). If it is determined that the initial location is within the dashed circle's radius around the intersection point 720, then a radial positional correction may or may not need to be applied based on other determinations. For example, if a velocity is above a first threshold with an uncertainty below a second threshold, and the heading direction matches closely with that of a line segment azimuth, then, a line segment is chosen and an appropriate perpendicular correction 722 is applied, as in case of initial location 702. On the other hand, if a velocity is below a first threshold, and the uncertainty is above a second threshold, or if the heading direction does not match with that of any of the line segment azimuths, then a radial correction 724 is applied.

Complex Traffic Patterns

Figure 8A:
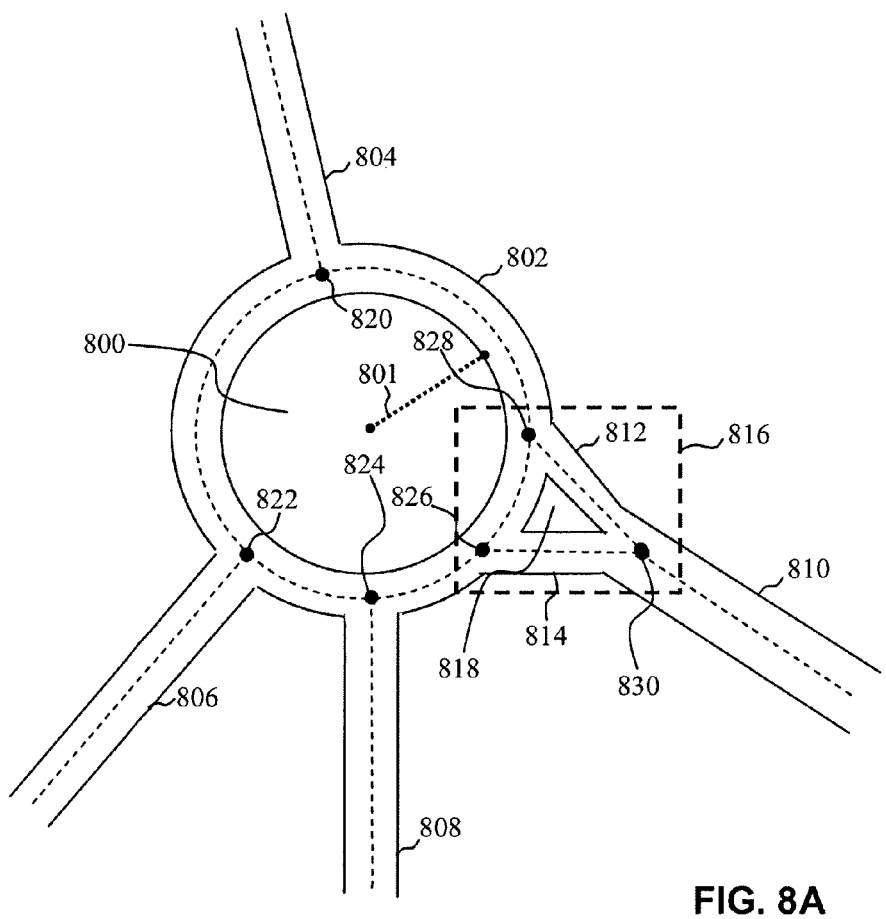
FIGS. 8A-8B and 9 depict examples of complex intersection point, connection point, and end points in a traffic network.
Figure 8B:
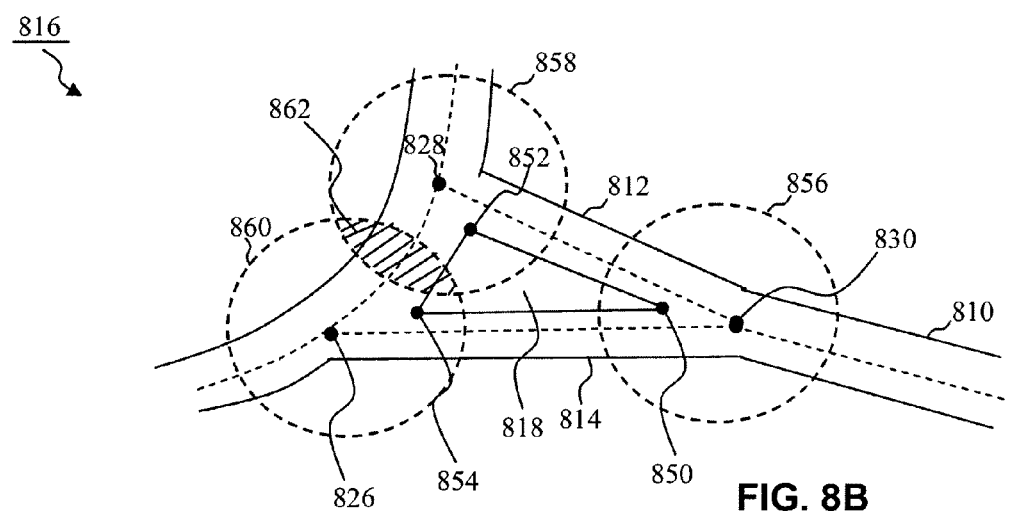
Figure 9:
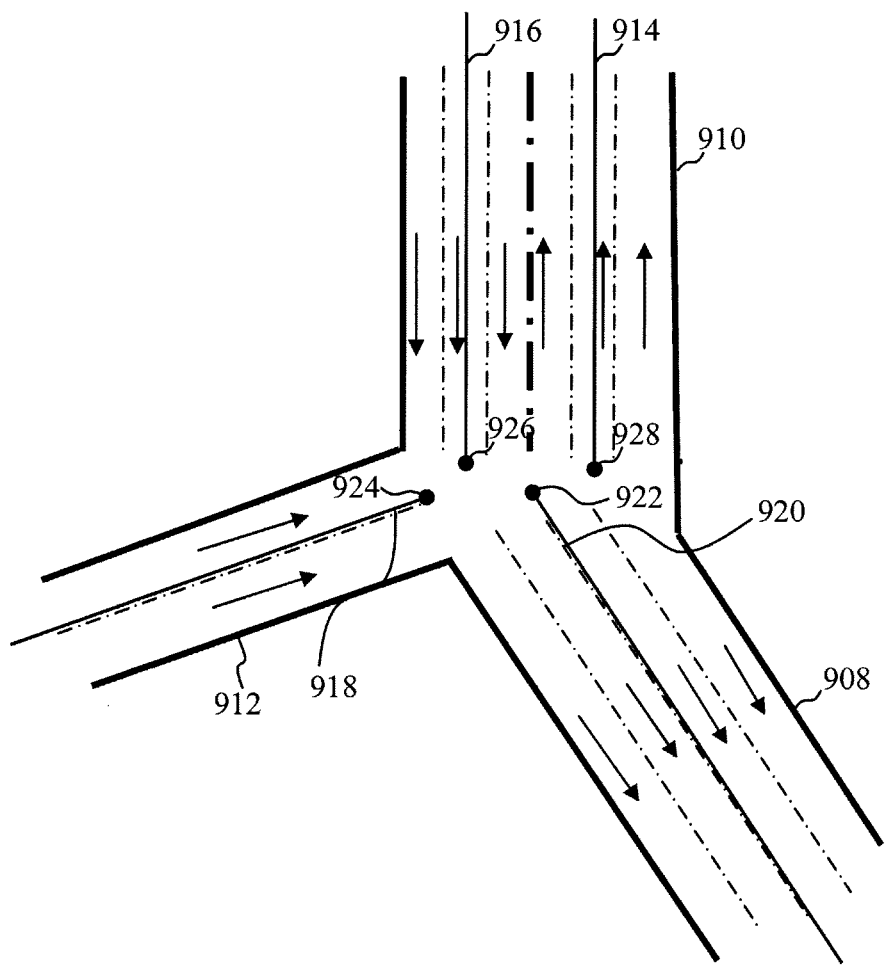

FIGS. 8A, 8B and 9 show examples of complex traffic patterns that may be encountered by a GPS receiver in an urban canyon environment. In FIG. 8A, a traffic circle 800 with radius 801 comprises a ring road 802 and a number of incoming/outgoing roads 804, 806, 808, 814 and 812 attached to it at corresponding connection/end points 820, 822, 824, 826 and 828. Roads 814 and 812 meet further down at a connection point 830 from where road 810 emerge/terminate. A polygonal traffic plaza 818 is enclosed by roads 812, 814, and 810, as shown within the dashed rectangle 816. The portion 816 is shown magnified in FIG. 8B.

In general, to apply an appropriate positional correction in or around a traffic circle, a connection point is chosen, and an intersection circle is imagines around each connection point, as the dashed circles 858, 860 and 856, shown in FIG. 8B. The threshold radius of the dashed circles are preferably greater than the widths of the roads. Note that there may be overlap region, such as the shaded region 862 shared by dashed circles 858 and 860.

Relevant attributes stored in the tiles database for a traffic circle like 800 include the radius 801 of the traffic circle, coordinates of the connection/end points, widths of the roads, number of lanes, direction of traffic flow on various roads/lanes, center-to-corner or corner-to-corner distance between corner points 850, 852, and 854 of the traffic plaza 818, line/road segment azimuths in between two end/connection points etc.

Appropriate perpendicular or radial positional correction is applied as discussed above with respect to FIGS. 6 and 7.

FIG. 9 shows another complex intersection where roads of different widths are meeting. A 6-lane road 910, a 2-lane road 912, and a 4-lane road 908 are interconnected. Each lane is shown as dash-dotted lines, and the traffic flow direction on each lane is shown by arrows. Line segments 914, 916, 918, and 920, with corresponding end points 928, 926, 924 and 922, respectively are stored in the map/tiles database with appropriate width-indices, and traffic flow direction indices. Note that the end points do not necessarily have to be connected to multiple roads/lanes, as in the case of intersection/connection/end points shown in FIGS. 6-8B.

Figure 10A:
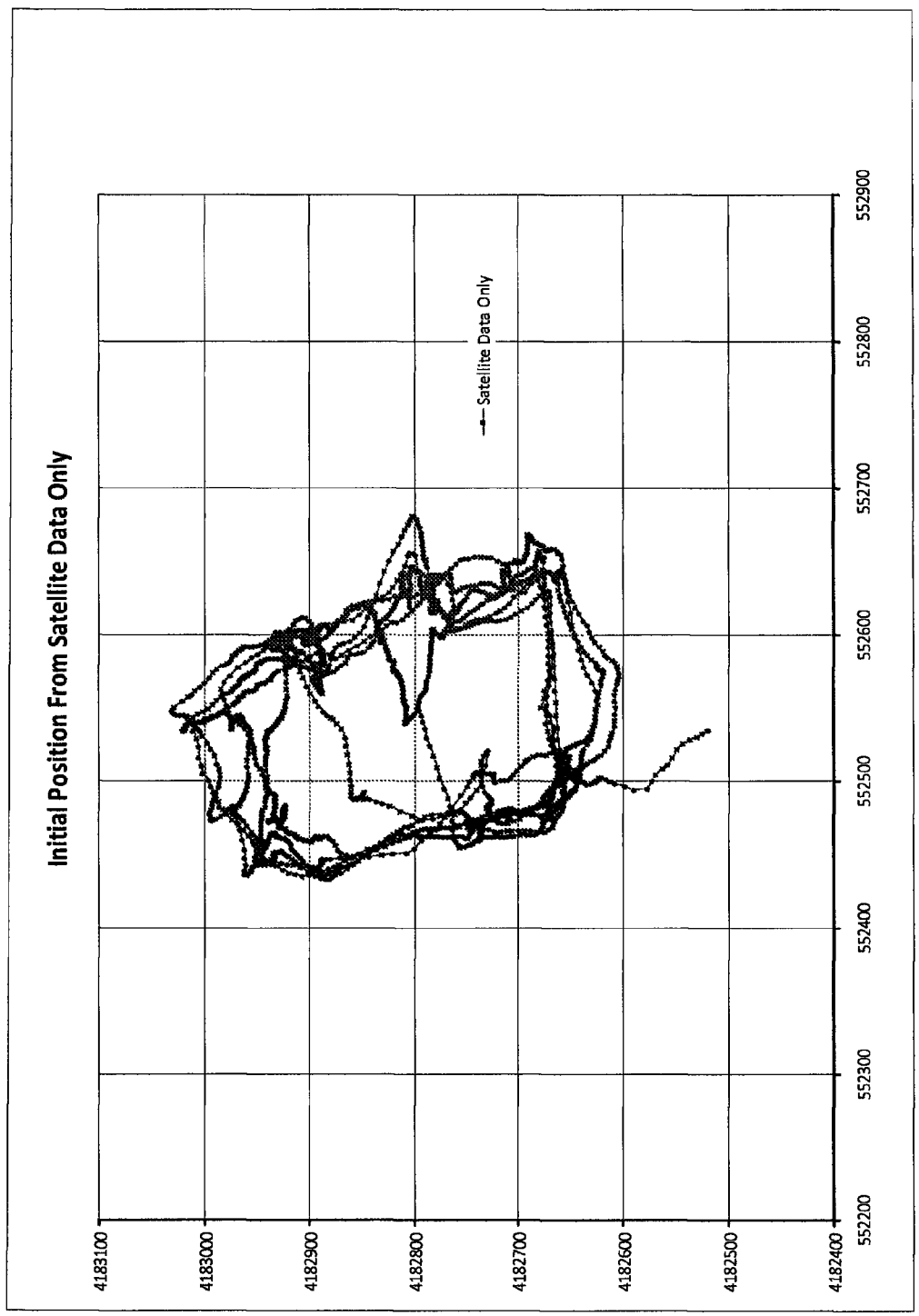
FIGS. 10A-B compare results of the present invention with results of a conventional methodology of position determination.
Figure 10B:
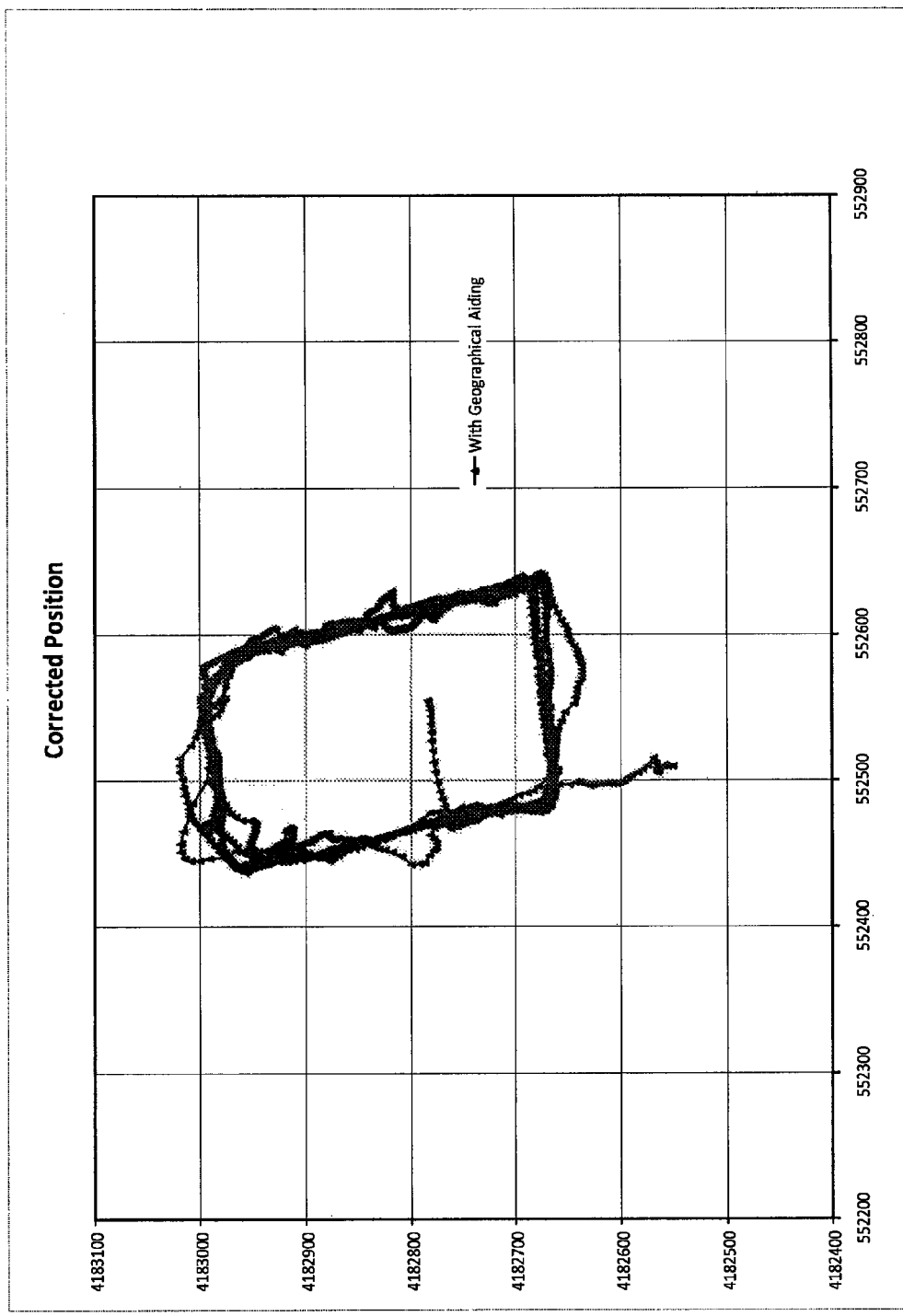

FIGS. 10A-B show how applying the geographically-aided positional correction algorithm of the present invention improves the positional accuracy in a GPS receiver. FIG. 10A represents position calculated using the conventional method of using satellite data only without using geographical-aiding, and FIG. 10B represents corrected positions calculated using the present invention's algorithm that uses geographical aiding. For clarity, the superimposition of actual road networks and other geographical objects from the map database are not shown in FIGS. 10A-B. The coordinate indices of an actual map of a city block within San Francisco are shown on the X and Y axes. It is clear that the present invention's algorithm does a better job of snapping a calculated position to an actual road, while the calculated positions without geo-aiding are not always snapped to the actual roads. For example, testing the present algorithm on a test route on an actual San Francisco road network, a median cross-track error was brought down to 11.9 m using the satellite-plus-geo-aiding algorithm from a median cross-track error value of 21.2 m using the satellite-only position calculation algorithm that does not use the geographical aiding provided by the present invention.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for improving positional accuracy of a receiver that receives satellite signals for navigation, the method comprising:

deriving an initial location from a navigation satellite system (NSS) data received at a GPS receiver, wherein the initial location is determined to be within an area of interest;

receiving selective cartography information from a location-aiding device coupled to the receiver, wherein the selective cartography information includes attributes of one or more geographic objects within the area of interest;

overlaying the initial location onto the selective cartography information;

deriving positional correction from the NSS data and the selective cartography information, wherein the deriving of the positional correction includes determining whether a radial positional correction, a perpendicular positional correction, or a combination thereof is applicable based on a proximity of the initial location with respect to the attributes of the one or more geographic objects;

applying the derived positional correction to the initial location to determine a corrected location of the receiver; and outputting the corrected location of the receiver.

2. The method of claim 1, wherein the location-aiding device is one or more of a remote server, and, an on-board computer external to a navigation device containing the receiver but located within a moving object that includes the navigation device.

3. The method of claim 1, wherein the attributes of the one or more geographic objects comprises one or more attributes including: line segments along roads, intersection points where two roads cross each other; connection points where a multi-lane road meets with another single or multi-lane road; end points where a road or a lane terminates; width of roads; number of lanes on a road; designated traffic direction of a road; width of each lane on a road; radial dimension of a traffic circle with connection points where corresponding roads connect with the traffic circle; and center-to-peripheral or corner-to-corner distance of a polygonal traffic plaza with connection points where corresponding roads connect with the traffic plaza.

4. The method of claim 1, wherein the positional correction to be applied is based on one or more metrics including: the initial location; uncertainty in the initial location; perpendicular distance between the initial location and a selected line segment; radial distance between the initial location and a selected intersection point; radial distance between the initial location and a selected connection point; heading direction; uncertainty in heading direction; velocity; uncertainty in velocity; width of lanes; uncertainty in the width of lanes; width of roads; and uncertainty in the width of roads.

5. The method of claim 1, wherein width-indicator index depends on a number of lanes on a road.

6. The method of claim 1, wherein the area of interest includes geographic regions where acquiring NSS signal is difficult due to one or more obstructions in an environment surrounding the receiver.

7. The method of claim 1, wherein the method further comprises:

receiving navigation state information of the receiver; and
using the navigation state information in conjunction with the NSS data and the selective cartography information to derive the positional correction.

8. The method of claim 7, wherein the navigation state information comprises one or more parameters of the receiver including a position, a heading direction, a velocity, and an altitude.

9. The method of claim 1, wherein a width-indicator index is assigned to intersection points, connection points, or end points of two or more roads or lanes and is stored as an attribute of the corresponding intersection point, connection point, or end point.

10. The method of claim 9, wherein a variance associated with the positional correction to be applied to the initial location is based on the width-indicator index.

11. The method of claim 1, wherein a width-indicator index is assigned to line segments along different roads and lanes, and is stored as an attribute of the corresponding road or lane.

12. The method of claim 11, wherein a variance associated with the positional correction to be applied to the initial location is based on the width-indicator index.

13. The method of claim 1, wherein the method further comprises:
using a navigational routine to correlate selective cartography information with the initial location derived from the NSS data while deriving the positional correction.

14. The method of claim 13, wherein the navigational routine uses one or more following techniques: least-squares combiner, Kalman filter, maximum likelihood estimator, particle filter, neural networks, and Bayesian estimator.

15. The method of claim 1, wherein the step of receiving selective cartography information comprises:
pre-storing cartography information about one or more areas of interests in a database at the location-aiding device, wherein each said area of interest includes said one or more geographic objects;
assigning attributes to the one or more geographic objects within each said area of interest;
partitioning each said area of interest into units of cartography information including corresponding attributes of one or more of the geographic objects;
using a map-matching algorithm to associate one or more units of cartography information with the determined initial location;
retrieving the one or more associated units of cartography information from the location-aiding device; and
extracting selective cartography information from the associated units of cartography information.

16. The method of claim 15, wherein the map-matching algorithm uses predetermined thresholds, including one or more of a perpendicular distance threshold, and a road segment azimuth threshold to select the associated units of cartography information.

17. The method of claim 15, where the map-matching algorithm further uses navigation state information to select the associated units of cartography information.

18. The method of claim 17, wherein the navigation state information comprises one or more parameters of the receiver including a position, a heading direction, a velocity, and an altitude.

19. The method of claim 1, wherein the step of deriving the positional correction comprises:
determining whether the initial location is closest to an intersection point, a connection point, or an end point, or closest to a line segment along a road.

20. The method of claim 19, wherein if it is determined that the initial location is closest to the intersection point, the connection point, or the end point, the method further comprises:
applying a positional correction based on a radial distance of the initial location from the intersection point, the connection point, or the end point, and a variance assigned for the intersection point, connection point, or the end point.

21. The method of claim 19, wherein if it is determined that the initial location is closest to the line segment along the road, the method further comprises:
applying a positional correction based on a perpendicular distance of the initial location from the line segment, and a variance assigned for the line segment.

22. The method of claim 19, wherein if it is uncertain whether the initial location is closest to the intersection point, the connection point, or the end point, or, closest to the line segment along the road, the method further comprises:
calculating respective radial positional corrections based on corresponding radial distances of the initial location from one or more of the closest intersection points, connection points, and end points, and, respective variances assigned to the closest intersection points, the connection points, and the end points;
calculating respective perpendicular positional corrections based on corresponding perpendicular distances of the initial location from one or more of the closest line segments along roads, and respective variances assigned to the line segments; and
calculating a final positional correction combining the respective radial positional corrections and the respective perpendicular positional corrections.

23. A system for improving positional accuracy of a receiver that receives satellite signals for navigation, wherein the system comprises:
a navigation device containing the receiver; and
a location-aiding device for pre-storing units of cartography information associated with an area of interest, from which selective cartography information is extracted, wherein the location-aiding device comprises one or more of a remote server, and, an on-board computer external to the navigation device but located within a moving object that includes the navigation device,
wherein the navigation device determines whether a radial positional correction, a perpendicular positional correction, or a combination thereof is applicable to improve the positional accuracy of an initial location calculated from the received satellite signals, the determination being based on a proximity of the initial location with respect to attributes of one or more geographic objects included in the extracted selective cartography information.

* * * * *